United States Patent
Thomeer (10) Patent No.: US 9,919,635 B2
(45) Date of Patent: Mar. 20, 2018

(54) REMOTE WELLSITE MATERIAL TRACKING

(71) Applicant: SCHLUMBERGER TECHNOLOGY CORPORATION, Sugar Land, TX (US)

(72) Inventor: Hubertus V. Thomeer, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 622 days.

(21) Appl. No.: 14/186,250

(22) Filed: Feb. 21, 2014

(65) Prior Publication Data
US 2014/0234059 A1 Aug. 21, 2014

Related U.S. Application Data (60) Provisional application No. 61/767,794, filed on Feb. 21, 2013.

(51) Int. Cl.
*B60P 1/00* (2006.01)
*B60P 3/14* (2006.01)

(52) U.S. Cl.
CPC .. *B60P 1/00* (2013.01); *B60P 3/14* (2013.01)

(58) Field of Classification Search
CPC .... B60P 1/00; B60P 3/14; E21B 41/00; E21B 41/0035; E21B 41/0057; E21B 41/16; E21B 41/162; E21B 41/164
See application file for complete search history.

(56) References Cited

U.S. PATENT DOCUMENTS

| 4,345,146 A | 8/1982 | Story et al. |
| 5,505,076 A | 4/1996 | Parkman et al. |
| 5,668,310 A | 9/1997 | Parkman et al. |
| 6,481,627 B1 | 11/2002 | Guerreri |
| 7,343,252 B2 | 3/2008 | Wiens |
| 8,214,103 B2 | 7/2012 | Kranz et al. |
| 2008/0295586 A1 | 12/2008 | Fosseen |
| 2010/0250139 A1* | 9/2010 | Hobbs ............... E21B 47/12 702/6 |
| 2012/0219391 A1* | 8/2012 | Teichrob ............ B65G 67/40 414/293 |

FOREIGN PATENT DOCUMENTS

WO    WO2011120074 A1    10/2011

OTHER PUBLICATIONS

Purvis et al., Field-Applied Computerized Tracking System: A Practical Approach to On-Site Quality Control, Sep./Oct. 1991, SPE Computer Application, pp. 22-28.*

\* cited by examiner

*Primary Examiner* — Toan Le
(74) *Attorney, Agent, or Firm* — Michael L. Flynn; Rachel E. Greene; Robin Nava (57) ABSTRACT

A wellsite system that includes a bulk material transporter, a mobile tagger, and an uplink. The bulk material transporter includes a supply of a bulk material, a meter to measure output from the supply, and a data logger to log the output as a function of a predetermined parameter. The mobile tagger assigns transfer parameters to each transfer of the bulk material from the supply to one of multiple assets located at the wellsite, including the output measured by the meter. The uplink wirelessly transmits data from the log and the transfer parameters to remote data storage not located at the wellsite.

16 Claims, 3 Drawing Sheets

REMOTE WELLSITE MATERIAL TRACKING

CROSS-REFERENCE TO RELATED APPLICATIONS

This application claims the benefit of U.S. Provisional Application No. 61/767,794, entitled "SYSTEM AND METHOD FOR RECORDING BULK MATERIAL DELIVERY AT A WELLSITE," filed Feb. 21, 2013, the entire disclosure of which is hereby incorporated herein by reference.

BACKGROUND OF THE DISCLOSURE

The drilling and operation of oil and gas wells generally occurs at a wellsite at which machinery, tanks, vehicles, and other physical assets are stationed for an extended period of time. Many of the physical assets utilize various consumables, such as fuel, water, and sand. In an effort to reduce related costs and errors attributable to human workers at the wellsite, various attempts have been made to automate the management of usage, supply levels, and resupplies of the consumables. However, the cost of such automation for a large, existing fleet of assets can be limiting to the scope of implementation. Deploying the automation across a large fleet can also be limited by related maintenance costs and logistics, because assets of large fleets less frequently return to maintenance facilities when demand for the assets increases. Past automation attempts were also plagued by the difficulties associated with the assets being resupplied across a substantial geographic area, including where asset and supply mobility became hampered by loss of wireless connectivity due to lack of line of site between assets at multiple wellsites, or even within a single wellsite.

SUMMARY OF THE DISCLOSURE

The present disclosure introduces a wellsite system that includes a bulk material transporter, a mobile tagger, and an uplink. The bulk material transporter includes a supply of a bulk material, a meter to measure output of the bulk material from the supply, and a data logger to log the output as a function of a predetermined parameter. The mobile tagger assigns transfer parameters to each transfer of bulk material from the supply to corresponding assets located at the wellsite. The transfer parameters include the output measured by the meter. The uplink wirelessly transmits data from the log and the transfer parameters to remote data storage not located at the wellsite.

The present disclosure also introduces a bulk material transporter that includes a supply of a bulk material, a motor vehicle to position the supply of bulk material proximate an asset selected to receive a resupply of the bulk material, and a meter carried by the motor vehicle to measure output of the bulk material from the supply. A data logger carried by the motor vehicle logs the output as a function of a predetermined parameter. A mobile tagger removable from the motor vehicle assigns transfer parameters to each transfer of bulk material from the supply to the selected asset. The transfer parameters include the output measured by the meter.

The present disclosure also introduces a method in which a wellsite asset is selected to receive a resupply of a bulk material, a motor vehicle is operated to position a supply of the bulk material proximate the selected wellsite asset, and a measured amount of the bulk material is transferred from the supply to the selected wellsite asset. A log of the output as a function of a predetermined parameter is generated. A mobile tagger is operated to assign transfer parameters to the transfer, wherein the transfer parameters include the measured amount of the bulk material output from the supply to the selected wellsite asset. Data from the log and the transfer parameters are wirelessly transmitted to remote data storage not located at the wellsite. The data from the log and the transfer parameters are synchronized with respect to time.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A person having ordinary skill in the art should also understand that, in the development of an actual embodiment within the scope of the present disclosure, numerous implementation-specific decisions may be made to achieve certain goals of the development, such as compliance with system-related and business-related constraints and other constraints that may vary from one implementation to another. It should be further appreciated that such a development effort may be complex and time consuming, but is nevertheless considered to be a routine undertaking for a person of ordinary skill in the art having the benefit of the present disclosure.

Additionally, the terminology and phraseology used herein may be used for descriptive purposes and, thus, may not be construed as limiting in scope. Language such as "including," "comprising," "having," "containing," or "involving," and variations thereof, is intended to be broad and encompass the subject matter listed thereafter, equivalents, and additional subject matter not recited.

In the context of the present disclosure, "bulk material" may include liquids, solids, and/or gas, and is not limited to those utilized during wellsite and/or other oilfield operations. One or more aspects of the present disclosure may relate to implementations in which the bulk material is or comprises combustion engine fuel, sand, proppant, guar, water, and other materials consumed in appreciable quantities at a wellsite, another oilfield location, and even other locations not associated with oil and gas operations. The proppant may comprise naturally occurring sand grains or gravel, man-made or specially engineered proppants, fibers, resin-coated sand, sintered bauxite and other high-strength ceramic materials, and/or other materials. However, one or more aspects of the present disclosure may reference the term "fuel" in lieu of "bulk material," although such convention is merely for the sake of convenience and ease of understanding, and should be understood by a person skilled in the art to be applicable to various apparatus, systems, and methods related to fuel and non-fuel bulk material, including sand, proppant, guar, water, and/or other materials.

The present disclosure also refers to a wellsite in association with some example implementations. A person having ordinary skill in the art will recognize that the term "wellsite" traditionally refers to the general location at which oil and/or gas drilling, completion, and/or production operations are ongoing with respect to one or more wildcat, exploration, appraisal, and/or production wells extending underground from the wellsite. However, the term "wellsite" may also refer to such location along with the numerous assets, equipment, vehicles, and/or facilities that are permanently or temporarily located at the location, including those that may consume bulk material as described above. Moreover, a person having ordinary skill in the art will recognize that one or more aspects of the present disclosure may also be applicable or readily adaptable to implementations at other, non-oilfield jobsites, where ongoing non-oilfield operations utilize assets that consume bulk materials. Thus, the term "wellsite" may refer to a traditional wellsite and/or non-oilfield jobsites within the scope of the present disclosure.

One or more aspects of the present disclosure generally relate to apparatus, systems, and methods for facilitating, capturing, tracking, synthesizing, analyzing, managing and/or utilizing bulk materials, including bulk materials consumed at an oilfield wellsite, such as fuel, sand, proppant, guar, water, and the like. One or more aspects of the present disclosure may also relate to wellsite bulk material data logging apparatus, systems, and/or related methods for using such apparatus and/or systems at a wellsite, such as for resupplying fuel and/or other bulk materials to multiple wellsite assets and/or tracking consumption of the bulk materials, perhaps in a timely manner and/or with increased efficiency.

In these respects, the apparatus, systems, and methods for tracking bulk material at an oilfield wellsite according to one or more aspects of the present disclosure may be utilized in providing bulk material in a timely manner to a wide variety of physical assets at the oilfield wellsite easily and accurately, and perhaps without paper, pen, or automated systems that are complex to maintain.

The present disclosure introduces: a data logger and associated transmitter; a portable, hand-held, and/or mobile "point of origin" tagger with timestamper; an uplink to transmit potentially time-synchronized consumption per asset per time data; and a remote data storage and/or other data/web server. The data logger is operable to capture the output of the bulk material using a meter and generate a log of such output with respect to time and/or other predetermined parameters, such as rate, temperature, type of bulk material, and/or others. The log may be wirelessly transmitted to the mobile tagger, the uplink, and/or other mobile devices and acquisition units at the wellsite and/or servers outside the wellsite, such as via satellite, cellular, and/or other wireless networks. The log may also be synchronized with data from the mobile tagger. The data logger may also store and/or process data, such as to generate and/or synchronize the log, among other operations.

The mobile tagger may allow a human operator to record a time and/or place linked to a particular asset while delivering bulk material to the asset. The mobile tagger may be a mobile device, such as a data phone, a personal digital assistant (PDA), and/or other wireless-enabled portable devices operable during bulk material transfer operations to tag a unique asset identifier with a timestamp and/or other transfer parameters. The mobile tagger may store and/or transmit such data to the data logger, the uplink, and/or a secondary data source, such as for synchronizing with another data source, repository, and/or other computer. The mobile tagger may be utilized to record when a bulk material delivery event occurs, so that such information may later be synchronized with the data from the data logger and/or other sources. The mobile tagger may also be equipped with optical character recognition (OCR) and/or other scanning means that the human operator may utilize to take a picture of the asset being resupplied, and that may automatically timestamp or otherwise tag the resupply event with parameters related to the transfer of the bulk material. If not equipped with OCR, or in addition thereto, the human operator may type or otherwise key in data and/or operate the mobile tagger to read a barcode and/or communicate with a radio frequency identification (RFID) device associated with the asset, the bulk material, the human operator, and/or other parameters related to the bulk material transfer.

The uplink may allow the transmission of data collected from the mobile tagger and/or the data logger to the remote data storage, such as a central database. The remote data storage may serve as a repository for the bulk material consumption and resupply data gathered for multiple wellsites in the field, and may be accessed via the Internet and/or other types of communications networks. Transmissions by the uplink may be across existing communications infrastructure at the wellsite, a portable field-ready network, and/or other networks.

The remote data storage is the repository for the bulk material consumption and transfer data gathered in the field by the data logger and the mobile tagger, as received via the transmission from the uplink. The stored data may be accessed via the Internet and/or other networks, perhaps by multiple types of users across multiple different geographic locations. Different users may also have different access levels to the remote data storage.

Thus, for example, the present disclosure introduces one or more systems, apparatus, and/or methods for recording deliveries of combustion engine fuel and/or other bulk materials at multiple wellsites, as well as logging and/or otherwise recording the amount of bulk materials delivered over time, in a manner that may easily be converted in existing equipment, that may save costs, and/or that requires little or no maintenance.

The present disclosure also introduces one or more mobile apparatus for recording bulk material delivery at multiple wellsites, including providing a timestamp with asset identification during the time an asset is being resupplied.

The present disclosure also introduces one or more systems, apparatus, and/or methods for recording fuel delivery at multiple wellsites, wherein the data logger is synchronized with the timestamp per asset identification.

The present disclosure also introduces one or more systems, apparatus, and/or methods for recording fuel delivery at multiple wellsites, wherein the synchronized data is wirelessly transmitted to the remote data storage, such as a central data server having web access.

The present disclosure also introduces one or more systems, apparatus, and/or methods for recording fuel delivery at multiple wellsites that allow access via mobile devices in various forms, such as to allow bulk material tracking per asset, emissions reporting, customer invoicing, alerts when bulk material supplies are nearly depleted, and/or other aspects.

The present disclosure also introduces one or more systems, apparatus, and/or methods for recording fuel delivery at multiple wellsites without adding instrumentation to existing assets being resupplied.

One or more aspects of the present disclosure pertain to a bulk material transporter (such as a fuel wagon or other motor vehicle), equipped with a data logger and sent to a wellsite to deliver bulk material to assets at the wellsite and/or perform other activities. The bulk material transporter is also equipped with a mobile tagger, which is or includes a portable timestamp device that the human operator operates to tag the asset as the asset is being resupplied, and also to record his/her identity. This creates an event that a specific operator has resupplied the asset at a specific time. While the operator is transferring bulk material to the asset, the data logger is recording the amount transferred, an identification of bulk material, and/or other parameters pertinent to the transfer. The operator then repeats the process with other assets at the wellsite, perhaps during the duration of operations at the wellsite.

During and/or after the wellsite assets are individually or collectively resupplied, the operator may trigger synchronization of data from the mobile tagger with the data from the data logger. Such synchronization may be performed by the uplink or an associated computer, the data logger or an associated computer, the mobile tagger or an associated computer, a computer carried by the bulk material transporter vehicle, and/or another computer. The synchronization may be at least partially performed by a computer or processor associated with the remote data storage. The data logger, the mobile tagger, the uplink, and/or one or more associated computers may be operable for wired and/or wireless intercommunication, such that a history may be developed for each asset, including when the asset was resupplied, by which operator, with what type of bulk material, and/or other parameters.

One or more aspects of the present disclosure pertain to a system for recording the bulk material being dispensed by the bulk material transporter and what is being delivered to the asset at the wellsite by recording two data streams. For example, the bulk material being dispensed at the bulk material transporter may be log data and the bulk material being delivered at the asset may be event data. A certain amount of time elapses while resupplying an asset before the operator can begin resupplying the next asset. If the operator captures the event of resupplying the asset at some point in that timeframe, then the amount of bulk material dispensed in an asset may be detected without automating the asset being resupplied or the delivery valve(s) of the bulk material transporter. After the data is synchronized, it may be disseminated to the remote data storage to be utilized in conjunction with related business transactions.

One or more aspects of the present disclosure may be applicable to other types of remote bulk material delivery where assets are spread out geographically such that the delivery mechanism is brought the asset. For example, systems and/or methods in accordance with various embodiments of the present disclosure may record sand delivered from a rock quarry or rail hauler, and then may be synchronized with the data logger to record when it was loaded, by whom, what type of material, and how much. In other words, systems and/or methods of the present disclosure are susceptible to various modifications, variations, and/or enhancements without departing from the scope of the present disclosure. Accordingly, the present disclosure expressly encompasses all such modifications, variations, and enhancements within its scope.

Figure 1:
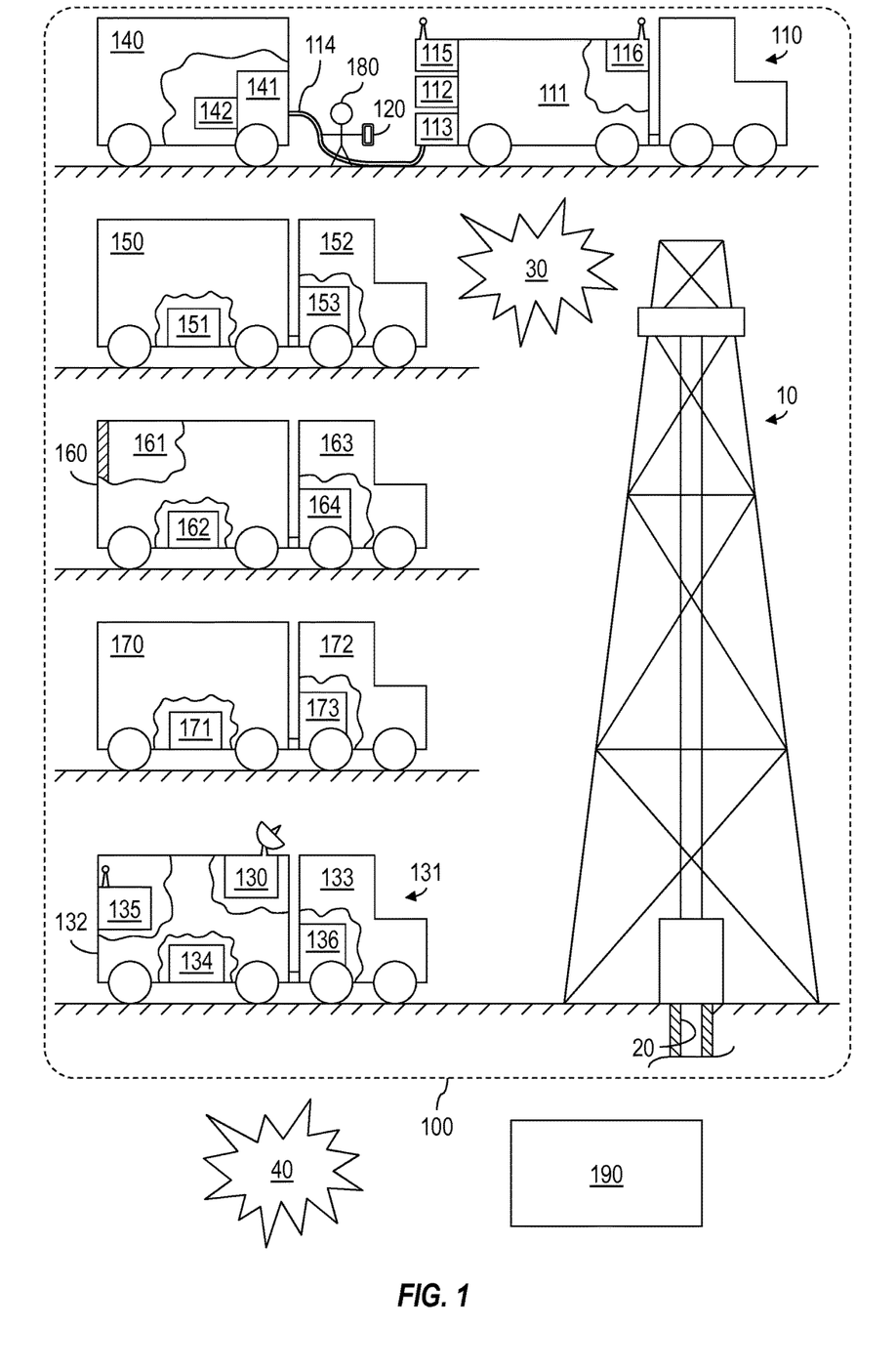
FIG. 1 is a schematic view of at least a portion of apparatus according to one or more aspects of the present disclosure.

FIG. 1 is a schematic view of at least a portion of a wellsite 100 according to one or more aspects of the present disclosure. The wellsite 100 is an example implementation of the systems, apparatus, and/or methods described above and/or otherwise within the scope of the present disclosure. The wellsite 100 includes a derrick, rig, and/or other structure 10 located over a well 20. The structure 10 may be for oil and/or gas drilling, completion, production, and/or other operations ongoing with respect to the well 20. A wellsite system deployed at the wellsite 100 includes at least a bulk material transporter 110, a mobile tagger 120, and an uplink 130, each of which may be characterized by one or more aspects described above and/or below.

The bulk material transporter 110 may be or comprise an industrial truck and/or other motor vehicle of sufficient hauling capability to carry and position a bulk material supply 111 proximate a selected one of multiple assets located at the wellsite 100. The bulk material supply 111 may include a tank and/or other container containing a large volume of the bulk material. The bulk material may be or comprise one or more of combustible engine fuel, sand, proppant, guar, water, and/or other materials consumed in bulk quantities at the wellsite 100. Examples of combustible engine fuel include biofuel, butane, compressed natural gas, diesel, ethanol, gasoline, hydrogen, liquefied natural gas, liquefied petroleum gas, liquid nitrogen, and propane, among others. Examples of proppant include naturally occurring sand grains or gravel, man-made or specially engineered proppants, fibers, resin-coated sand, sintered bauxite and other high-strength ceramic materials, and/or other materials.

In the example implementation depicted in FIG. 1, the bulk material transporter 110 is delivering bulk material to an asset 140 having a tank and/or other container 141 for receiving and containing the bulk material. For example, the bulk material may be combustible engine fuel, and the asset 140 may be or include a generator powered by such fuel. The generator asset 140 may be wheeled, trailer-mounted, and/or otherwise movable by a semi-trailer tractor and/or other motor vehicle asset (not shown). However, many other assets are also within the scope of the present disclosure.

For example, another asset at the wellsite 100 may be a pump asset 150 having a tank and/or other container 151 for receiving and containing the bulk material. As with the generator asset 140, the bulk material may be combustible engine fuel, and the pump asset 150 may be or include a pump powered by such fuel. The pump asset 150 may be wheeled, trailer-mounted, and/or otherwise movable by a semi-trailer tractor and/or other motor vehicle asset 152. The motor vehicle asset 152 may also include a tank 153 that may be resupplied with the bulk material according to one or more aspects of the present disclosure.

Another example asset at the wellsite 100 may be a bulk material storage asset 160 having a tank and/or other container 161 for storing the bulk material and another, perhaps smaller tank and/or other container 162 for receiving and containing the bulk material utilized to operate the bulk material storage asset 160. The bulk material stored in the storage container 161 may be different from the bulk material stored in the operating container 162. For example, the bulk material stored in the storage container 161 may be sand, proppant, guar, water, and/or other non-fuel materials, whereas the bulk material stored in the operating container 162 may be combustion engine fuel utilized to power a pump and/or other apparatus for transferring the non-fuel material into and/or out of the storage container 161. The bulk material storage asset 160 may be wheeled, trailer-mounted, and/or otherwise movable by a semi-trailer tractor and/or other motor vehicle asset 163. The motor vehicle asset 163 may also include a tank 164 that may be resupplied with the bulk material according to one or more aspects of the present disclosure.

Another example asset at the wellsite 100 may be a blending asset 170 having a tank and/or other container 171 for receiving and containing the bulk material. As with the examples above, the bulk material may be combustible engine fuel, and the blending asset 170 may be or include a pump, motor, mixer, blender, and/or other apparatus powered by such fuel, such as to blend fracking fluid, drilling mud, and/or other fluids blended in large quantities at the wellsite 100. The blending asset 170 may be wheeled, trailer-mounted, and/or otherwise movable by a semi-trailer tractor and/or other motor vehicle asset 172. The motor vehicle asset 172 may also include a tank 173 that may be resupplied with the bulk material according to one or more aspects of the present disclosure.

The bulk material transporter 110 also carries a transfer parameter sensor 112 in communication with the bulk material supply 111 and/or one or more delivery valves 113 through which bulk material is pumped or otherwise transferred to a tank and/or other receiving container of an asset via tubing 114, such as to the container 141 of the generator asset 140, as depicted in FIG. 1. The transfer parameter sensor 112 may be or comprise a meter operable to measure output of the bulk material from the bulk material supply 111. For example, the transfer parameter sensor 112 may be or comprise a meter operable to measure a volume, mass, weight, rate, and/or other parameter regarding the amount of bulk material being transferred from the bulk material supply 111. The transfer parameter sensor 112 may also or instead be or comprise one or more sensors operable to measure temperature, pressure, density, composition, water content, gas/vapor content, color, and/or other parameters of the bulk material being transferred from the bulk material supply 111. The transfer parameter sensor 112 may also or instead be or comprise one or more sensors operable to measure temperature, pressure, humidity, dew point, daylight, and/or other parameters of the ambient environment at the wellsite 100.

The bulk material transporter 110 also carries a data logger 115 operable to log the output of bulk material from the bulk material supply 111 as a function of a predetermined parameter. For example, the data logger 115 may log the output of bulk material from the bulk material supply 111 as a function of time. The time may be that of a local clock, such as may be implemented as a function or component of the data logger 115 and/or another processor or computer of the bulk material transporter 110. The time may instead or also be that of a clock implemented as a function of another component of/at the wellsite 100. The time may also include information about the current date, and may correspond to the time zone in which the wellsite 100 is located or another time zone, such as when the time is expressed as Coordinated Universal Time (UTC) or Greenwich Mean Time (GMT). The function of the predetermined parameter may also or instead be a function of another parameter, such as may be measured by the transfer parameter sensor 112 and/or the mobile tagger 120. The bulk material transporter 111 may also include a computer 116 operable to control the data logger 115, synchronize data from the log generated by the data logger 115 with data received from the mobile tagger 120, and/or wirelessly transmit the synchronized data to the uplink 130. The data logger 115 and the computer 116 may be the same computer.

The mobile tagger 120 is operable to assign one or more transfer parameters to each transfer of bulk material from the bulk material supply 111 to an asset located at the wellsite 100. The one or more transfer parameters may include the output measured by the meter and/or parameters measured by other sensors of the transfer parameter sensor 112. The mobile tagger 120 may instead or also be operable to measure temperature, pressure, humidity, dew point, daylight, location, weather condition, and/or other parameters of the ambient environment at the wellsite 100, and to include such information as or with the one or more transfer parameters. The one or more transfer parameters may also include the time of a clock implemented as a function or component of the mobile tagger 120 and/or another processor, computer, or component of/at the wellsite 100. The time may also include information about the current date, and may correspond to the time zone in which the wellsite 100 is located or another time zone, such as when the time is expressed as Coordinated Universal Time (UTC) or Greenwich Mean Time (GMT).

The mobile tagger 120 may be, comprise, or be implemented within a portable, handheld device, such as a smartphone, a personal digital assistant (PDA), a tablet computer, a netbook computer, a laptop computer, and/or other portable devices. Wireless communications between the mobile tagger 120 and the data logger 115, the uplink 130, and/or other components may be via one or more WLANs 30 at the wellsite 100. However, wireless connectivity may also or instead be via one or more cellular telecommunications networks, satellite communications networks, the Internet, and/or other networks, as collectively designated by reference numeral 40 in FIG. 1. The mobile tagger 120 may include internal memory and/or other data storage, as well as processing capabilities, such as for synchronizing the assigned transfer parameters and the log generated by the data logger 115.

The mobile tagger 120 may also be operable to scan a code associated with or otherwise identifying the wellsite 100, a code associated with or otherwise identifying the asset, and/or a code associated with or otherwise identifying a human operator 180 executing the bulk material resupply. Such identification of the wellsite 100, the asset, and/or the operator 180 may also be included in the assigned transfer parameters. The codes scanned by the mobile tagger 120 may include alphanumeric codes (such as may be detectable via optical character recognition), barcodes, and/or RFID codes, among others.

The uplink 130 is operable to wirelessly transmit data from the log generated by the data logger 115 and the transfer parameters assigned by the mobile tagger 120 to remote data storage 190 not located at the wellsite 100. The uplink 130 may be a component of an acquisition vehicle 131 positioned at the wellsite 100 as a local repository of information from the data logger 115, the mobile tagger 120, and/or other components at the wellsite 100. For example, the tank 141 of the asset 140 may include a sensor 142 operable to detect a supply level of the bulk material in the tank 141. The detected supply level and other data from other assets at the wellsite 100 may be wirelessly communicated to the acquisition vehicle 131 for processing and/or transmission to other assets at or remote from the wellsite 100, and/or for utilization by other human operators at or remote from the wellsite 100.

At least a portion of the acquisition vehicle 131 may also be an asset resupplied by the bulk material transporter 110. For example, the acquisition vehicle 131 may include a trailer asset 132 and a motor vehicle asset 133. The acquisition trailer asset 132 may have a tank and/or other container 134 for receiving and containing the bulk material. As with the examples above, the bulk material may be combustible engine fuel, and the acquisition trailer asset 132 may be or include a generator and/or other apparatus powered by such fuel, such as to power various electronic equipment therein. Such electronic equipment may include the uplink 130, a wireless-enabled computer 135, and/or other components. The motor vehicle asset 133 may also include a tank 136 that may be resupplied with the bulk material according to one or more aspects of the present disclosure.

As described above, the data logger 115, the mobile tagger 120, and/or the uplink 130 may be individually or collectively operable to synchronize the log data from the data logger 115 and the transfer parameters assigned by the mobile tagger 120. One or more other computers at the wellsite 100 (e.g., wireless-enabled computer 135 carried by the acquisition trailer asset 132) may also be operable to synchronize the log data from the data logger 115 and the transfer parameters assigned by the mobile tagger 120, whether independently or in conjunction with one or more of the data logger 115, the mobile tagger 120, and/or the uplink 130.

Synchronization of the log data from the data logger 115 and the transfer parameters from the mobile tagger 120 may be with respect to time and/or another parameter. Such synchronization may be performed by the uplink 130 and/or other components prior to transmission by the uplink 130 to the remote data storage 190. However, such synchronization may also be performed after such transmission, such as by the remote data storage 190 and/or another computer or processor associated with the remote data storage 190. The transmission by the uplink 130 may be via one or more of the networks 30 and/or 40 described above.

The remote data storage 190 may comprise one or more databases, processors, computers, and/or other electronic devices. The wellsite system comprising the bulk material transporter 110, the mobile tagger 120, and the uplink 130 may also be considered to include the remote data storage 190. Data stored in the remote data storage 190 may be accessible by multiple users in different geographic locations, perhaps including different countries or even continents. Different users may also have different levels of access. For example, employees of a first company may have unlimited access to the remote data storage 190, whereas employees of a second company may have limited access to just a portion of the data in the remote data storage 190. In one such implementation, the first company may own and/or manage the wellsite system comprising the bulk material transporter 110, the mobile tagger 120, and the uplink 130 (and perhaps the remote data storage 190), and the second company may be a vendor or customer of the first company, or have some other relationship with the first company that would behoove the first company to limit the access levels of employees of the second company.

Figure 2:
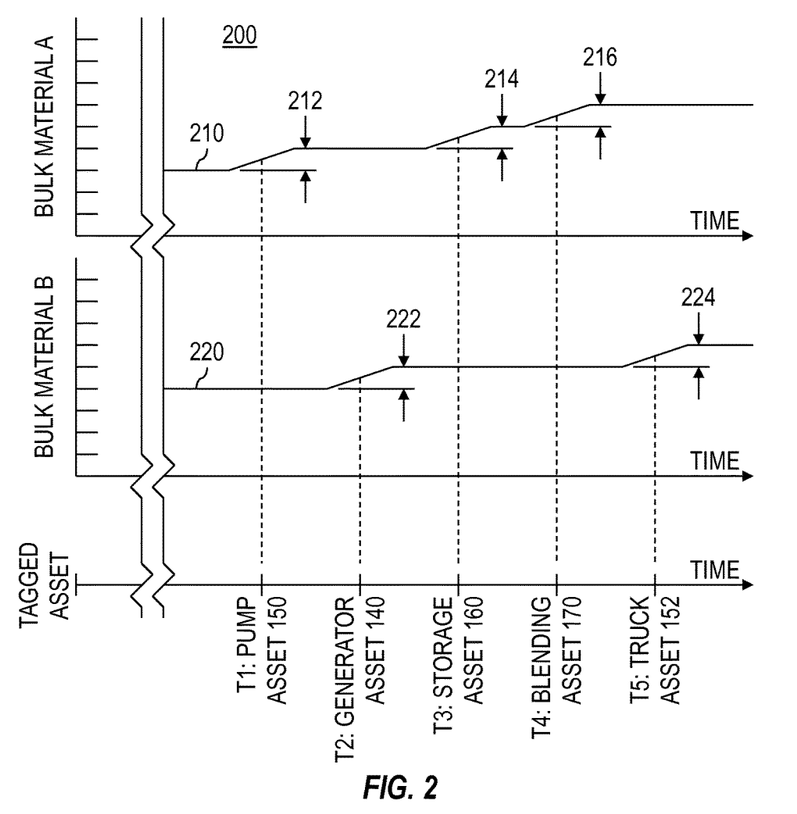
FIG. 2 is a graph depicting one or more aspects of the present disclosure.

FIG. 2 is a graph 200 depicting an example implementation of the synchronization described above. The following description refers to FIGS. 1 and 2, collectively.

The graph 200 includes a first curve 210 representing a log of deliveries of a first bulk material "A" with respect to time, such as may be generated by the data logger 115 of the bulk material transporter 110. The graph 200 also includes a second curve 220 representing a log of deliveries of a second bulk material "B" with respect to time, such as may be generated by a similar data logger of another bulk material transporter (not shown), which may be at the wellsite 100 or another wellsite. The types of bulk materials represented in the graph 200 by the bulk materials A and B may be the same (e.g., both may be diesel fuel) or different (e.g., bulk material A may be water and bulk material B may be sand). The abscissa or horizontal axis of the graph 200 tracks asset tags generated by the mobile tagger 120 with respect to time, and each asset tag may include one or more transfer parameters assigned by the mobile tagger 120. The ordinate or vertical axis of the graph 200 corresponds to cumulative amounts of delivered bulk materials A and B, which may be in units of volume, mass, and/or others, such as may be measured by the transfer parameter sensor 112 associated with each bulk material.

At time T1, the pump asset 150 was tagged as receiving a resupply of bulk material A, and the bulk material A log 210 includes an increase 212 indicating a delivery at or near the same time. Thus, the data obtained by the data logger 115 pertaining to the increase 212 and the transfer parameters corresponding to the increase 212 (such parameters being assigned/tagged by the human operator 180 with the mobile tagger 120) may be synchronized with respect to time and/or other parameters (asset identifier, location, etc.). Such synchronization may be performed by one or more of the data logger 115, the mobile tagger 120, the uplink 130, and/or other components at the wellsite 100, and then transmitted to the remote data storage 190. However, at least part of the synchronization and/or other processing of some of the related data may also or instead be performed after transmission to the remote data storage 190, whether by the remote data storage 190 and/or an associated processor or computer.

Similarly, at time T2, the generator asset 140 was tagged as receiving a resupply of bulk material B, and the bulk material B log 220 includes an increase 222 indicating a delivery at or near the same time. Thus, the data obtained by the corresponding data logger (not shown) pertaining to the increase 222 and the transfer parameters corresponding to the increase 222 may be synchronized with respect to time and/or other parameters.

At time T3, the bulk material storage asset 160 was tagged as receiving a resupply of bulk material A, and the bulk material A log 210 includes an increase 214 indicating a delivery at or near the same time. Thus, the data obtained by the data logger 115 pertaining to the increase 214 and the transfer parameters corresponding to the increase 214 may be synchronized with respect to time and/or other parameters.

At time T4, the blending asset 170 was tagged as receiving a resupply of bulk material A, and the bulk material A log 210 includes an increase 216 indicating a delivery at or near the same time. Thus, the data obtained by the data logger 115 pertaining to the increase 216 and the transfer parameters corresponding to the increase 216 may be synchronized with respect to time and/or other parameters.

At time T5, the motor vehicle asset 152 associated with the pump asset 150 was tagged as receiving a resupply of bulk material B, and the bulk material B log 220 includes an increase 224 indicating a delivery at or near the same time. Thus, the data obtained by the corresponding data logger (not shown) pertaining to the increase 224 and the transfer parameters corresponding to the increase 224 may be synchronized with respect to time and/or other parameters.

Figure 3:
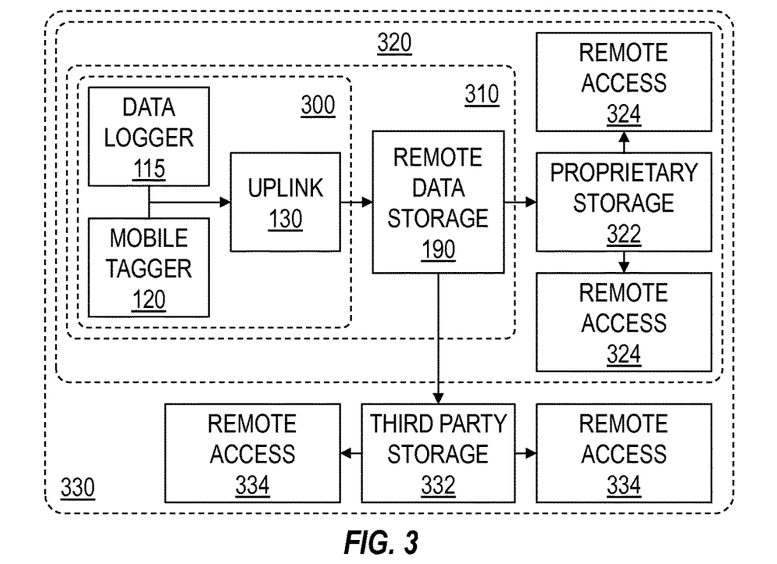
FIG. 3 is a block diagram of at least a portion of apparatus according to one or more aspects of the present disclosure.

FIG. 3 is a block-diagram of at least a portion of an example implementation of the wellsite system described above with respect to FIG. 1, hereinafter designated by reference numeral 300. As described above, the wellsite system 300 may comprise the data logger 115 (and perhaps the bulk material transporter 110 carrying the data logger 115), the mobile tagger 120, and the uplink 130, among other possible components. A similar wellsite system 310 may further comprise the remote data storage 190. Another similar wellsite system 320 may further comprise proprietary data storage 322, and perhaps one or more remote access devices 324. Yet another example wellsite system 330 may further comprise third party storage 332, and perhaps one or more remote access devices 334.

The remote data storage 190 may be the central repository for bulk material delivery data obtained via data loggers and mobile taggers at multiple wellsites in the field. The proprietary data storage 322 may also include the bulk material delivery data or at least a portion thereof, and may also include data from other sources, including data not pertaining to bulk material delivery data. For example, the proprietary data storage 322 may be part of one or more internal business systems owned and/or managed by the same entity that owns and/or manages the bulk material delivery data. The third party data storage 332 may also include a portion of the bulk material delivery data, but such portion may be limited based on the relationship between the third party and the owner/manager of the bulk material delivery data. The third party data storage 332 may also include data from other sources, including data not pertaining to bulk material delivery data. For example, the third party data storage 332 may be part of one or more third party business systems.

The remote access devices 324 and 334 may be user terminals located at or remote from other components of the wellsite system 320 and 330, respectively. For example, the remote access devices 324 and 334 may each be or comprise a computer, smart phone, and/or other web-enabled device, including those that may communicate via one or more of the networks 30 and 40 shown in FIG. 1. The remote access devices 324 and 334 may be operable by employees, perhaps having different levels of access to the bulk material delivery data in their respective storage 322 and 332, to be utilized for various business purposes, such as invoicing, logistics, emissions reporting, employee time sheets, etc.

Figure 4:
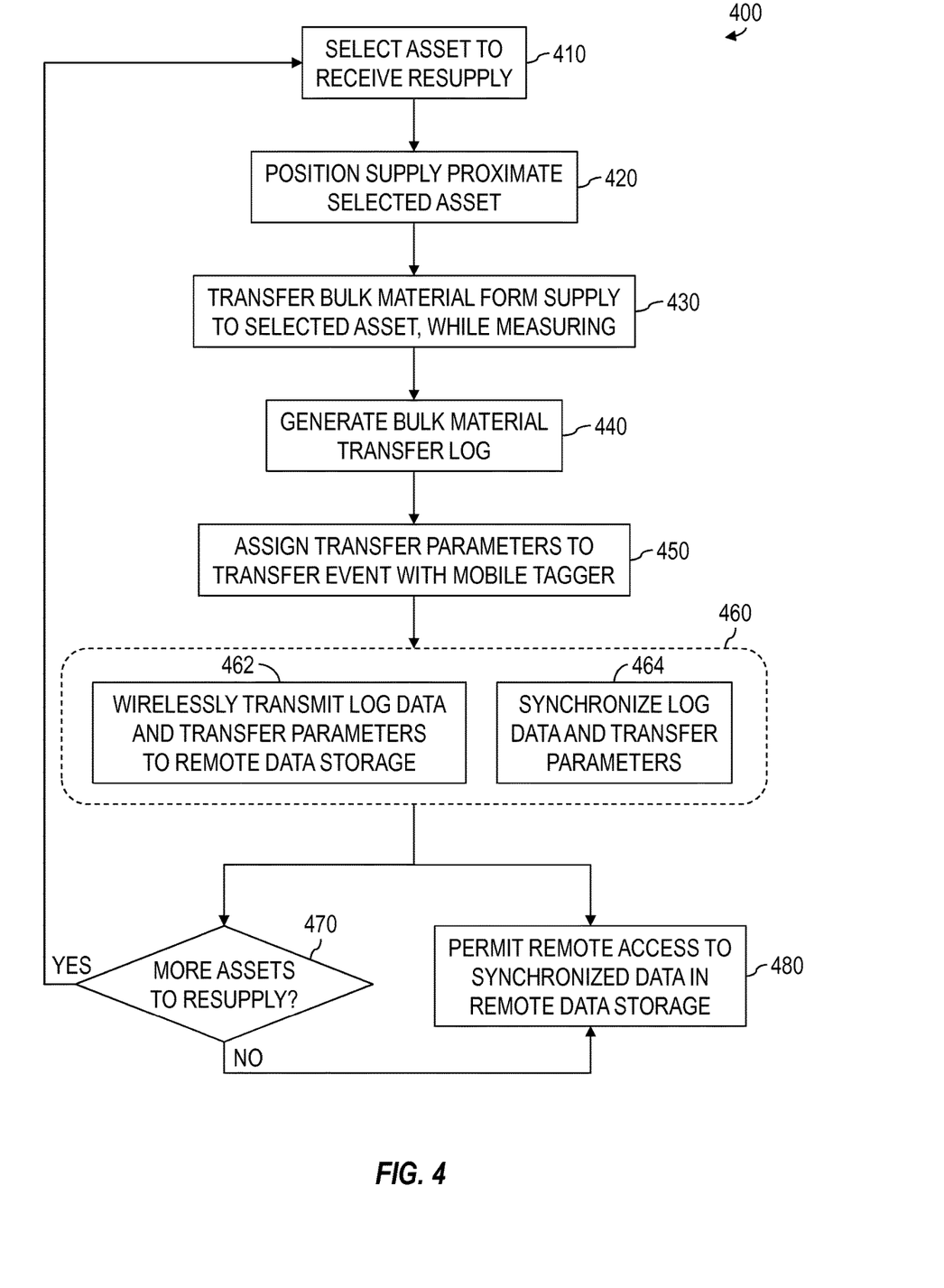
FIG. 4 is a flow-chart diagram of at least a portion of a method according to one or more aspects of the present disclosure.

FIG. 4 is a flow-chart diagram of at least a portion of a method (400) according to one or more aspects of the present disclosure. The method (400) may be performed according to one or more aspects described above and/or depicted in one or more of FIGS. 1-3.

The method (400) includes selecting (410) one of a plurality of wellsite assets at a wellsite to receive a resupply of a bulk material. For example, the plurality of wellsite assets may include one or more of the acquisition asset 132, the motor vehicle asset 133, the generator asset 140, the pump asset 150, the motor vehicle asset 152, the bulk material storage asset 160, the motor vehicle asset 163, the blending asset 170, and/or the motor vehicle asset 172 shown in FIG. 1.

A motor vehicle may then be operated to position (420) a supply of the bulk material proximate the selected wellsite asset. For example, the bulk material transporter 110 may position (420) the bulk material supply 111 proximate the generator asset 140 shown in FIG. 1.

A measured amount of the bulk material may then be output or transferred (430) from the supply to the selected wellsite asset. For example, in the example implementation depicted in FIG. 1, the meter or other transfer parameter sensor 112 of the bulk material transporter 110 may measure the amount of bulk material transferred (430) from the bulk material supply 111 to the tank 141 of the generator asset 140 through the one or more delivery valves 113 and the tubing 114.

A log of the output or transfer of bulk material may simultaneously or thereafter be generated (440). For example, in the example implementation depicted in FIG. 1, the data logger 115 of the bulk material transport 110 may generate (440) a log of the output or transfer of bulk material as a function of time and/or another predetermined parameter.

One or more transfer parameters may then be assigned (450) to the transfer, such as by operation of the mobile tagger 120 shown in FIG. 1. The transfer parameters may include the measured amount of the bulk material output from the bulk material supply 111 to the selected wellsite asset. For example, in the example implementation depicted in FIG. 1, the transfer parameters may be sensed or otherwise obtained via the data logger 115 and/or the mobile tagger 120, among other components at the wellsite 100.

The method (400) also includes one or more actions (460) for transmitting (462) and synchronizing (464) the log data and transfer parameters. For example, in the example implementations depicted in FIGS. 1-3, the uplink 130 may wirelessly transmit (462) data from the log generated (440) by the data logger 115 and the transfer parameters assigned (450) by the mobile tagger 120 to the remote data storage 190 not located at the wellsite 100. Thereafter, the data may be synchronized (464) with respect to time and/or other predetermined parameters. Such synchronization (464) may be performed via a computer or processor associated with the remote data storage 190. However, the data logger 115, the mobile tagger 120, the uplink 130, and/or one or more other components at the wellsite 100 may also or instead perform the synchronization (464) prior to transmission (462) to the remote data storage 190, such that the synchronized (464) data may be transmitted (464) instead of or in addition to the data from the log generated (440) by the data logger 115 and the transfer parameters assigned (450) by the mobile tagger 120.

The method (400) may include determining (470) whether to resupply additional assets at the wellsite. If additional assets are to be resupplied, the next asset may be selected (410), and the method (400) may be repeated. If no additional assets are to be resupplied, remote access to the synchronized data may be permitted (480). However, such permission (480) may not be withheld pending completion of the method (400), but may instead be granted during ongoing iterations of the method (400) and otherwise.

In view of the entirety of the present disclosure, including FIGS. 1-4, a person having ordinary skill in the art will readily recognize that the present disclosure introduces a wellsite system comprising: a bulk material transporter comprising: a supply of a bulk material; a meter operable to measure output of the bulk material from the supply; and a data logger operable to log the output as a function of a predetermined parameter; a mobile tagger operable to assign a plurality of transfer parameters to each of a plurality of transfers of the bulk material from the supply to corresponding ones of a plurality of assets located at the wellsite, wherein the plurality of transfer parameters includes the output measured by the meter; and an uplink operable to wirelessly transmit data from the log and the plurality of transfer parameters to remote data storage not located at the wellsite.

The bulk material transporter may be a motor vehicle operable to position the supply proximate one of the plurality of assets selected to receive a resupply of the bulk material from the supply.

The bulk material may be combustion engine fuel. The fuel may be selected from the group consisting of: gasoline; diesel; ethanol; compressed natural gas; liquefied natural gas; biofuel; hydrogen; liquid nitrogen; liquefied petroleum gas; propane; and butane.

The bulk material may be selected from the group consisting of: sand; proppant; guar; and water.

The function of the predetermined parameter may be a function of time, which may include date. The function of the predetermined parameter may be a function of both time and another predetermined parameter. The function of the predetermined parameter may be a function of both time and an output rate measured by the meter. The function of the predetermined parameter may be a function of both time and a measured temperature of the output material. The function of the predetermined parameter may be a function of both time and a measured ambient temperature at the wellsite.

The mobile tagger may be a handheld wireless device.

The plurality of transfer parameters may include time, which may include date. The plurality of transfer parameters may include the current location of the wellsite. The plurality of transfer parameters may include an identifier associated with the wellsite and differentiating the wellsite from other wellsites. The mobile tagger may be operable to scan a code associated with the wellsite to identify the wellsite. The code may be selected from the group consisting of: an alphanumeric code, a barcode, and a radio frequency identification code.

The plurality of transfer parameters may include an identification of which of the plurality of assets is currently receiving bulk material output from the supply. The mobile tagger may be operable to scan a code associated with each of the plurality of assets to identify which of the plurality of assets is currently receiving bulk material output from the supply. The code may be selected from the group consisting of: an alphanumeric code, a barcode, and a radio frequency identification code.

The plurality of transfer parameters may include an identification of a human operator that is performing the transfer of bulk material from the supply to the asset.

The plurality of assets may include a motor vehicle powered by the bulk material and operable to transport another one of the plurality of assets that is also powered by the bulk material. The plurality of assets may include: a pump powered by the bulk material; and a generator powered by the bulk material.

The data from the transporter and the mobile tagger transmitted by the uplink may be synchronized with respect to time. The uplink may be further operable to synchronize the data from the bulk material transporter and the mobile tagger with respect to time prior to transmitting the synchronized data to the remote data storage. The uplink may be operable to wirelessly transmit data via at least one network selected from the group consisting of: a satellite telecommunications network; a cellular telecommunications network; and a wireless local area network (WLAN).

The bulk material transporter may further comprise a computer operable to: control the data logger; synchronize the log with data received from the mobile tagger; and wirelessly transmit the synchronized data to the uplink.

The wellsite system may further comprise the remote data storage, and the data received by the remote data storage from the uplink may be accessible by multiple users in different geographic locations. The multiple users may have different access levels.

The present disclosure also introduces a bulk material transporter comprising: a supply of a bulk material; a motor vehicle operable to position the supply of bulk material proximate one of a plurality of assets selected to receive a resupply of the bulk material; a meter carried by the motor vehicle and operable to measure output of the bulk material from the supply; a data logger carried by the motor vehicle and operable to log the output as a function of a predetermined parameter; and a mobile tagger removable from the motor vehicle and operable to assign a plurality of transfer parameters to each of a plurality of transfers of the bulk material from the supply to the selected one of the plurality of assets, wherein the plurality of transfer parameters includes the output measured by the meter.

The function of the predetermined parameter may be a function of time, which may include date. The function of the predetermined parameter may be a function of both time and another predetermined parameter. The function of the predetermined parameter may be a function of both time and an output rate measured by the meter. The function of the predetermined parameter may be a function of both time and a measured temperature of the output material. The function of the predetermined parameter may be a function of both time and a measured ambient temperature at the wellsite.

The mobile tagger may be a handheld wireless device.

The plurality of transfer parameters may include time, which may include date. The plurality of transfer parameters may include the current location of the bulk material supply transport vehicle. The plurality of transfer parameters may include an identifier associated with the current location and differentiating the current location from other locations. The mobile tagger may be operable to scan a code associated with the current location to identify the current location. The code may be selected from the group consisting of: an alphanumeric code, a barcode, and a radio frequency identification code.

The plurality of transfer parameters may include an identification of which of the plurality of assets is selected to receive a resupply of the bulk material. The mobile tagger may be operable to scan a code indicative of the identification. The code may be selected from the group consisting of: an alphanumeric code, a barcode, and a radio frequency identification code.

The plurality of transfer parameters may include an identification of a human operator that is performing the transfer of bulk material from the supply to the asset.

The bulk material transporter may further comprise a computer operable to: control the data logger; synchronize the log with data received from the mobile tagger; and wirelessly transmit the synchronized data.

The present disclosure also introduces a method comprising: selecting one of a plurality of wellsite assets at a wellsite to receive a resupply of a bulk material; operating a motor vehicle to position a supply of the bulk material proximate the selected one of the plurality of wellsite assets; transferring a measured amount of the bulk material output from the supply to the selected one of the plurality of wellsite assets; generating a log of the output as a function of a predetermined parameter; operating a mobile tagger to assign a plurality of transfer parameters to the transfer, wherein the plurality of transfer parameters includes the measured amount of the bulk material output from the supply to the selected one of the plurality of wellsite assets; wirelessly transmitting data from the log and the plurality of transfer parameters to remote data storage not located at the wellsite; and synchronizing the data from the log and the plurality of transfer parameters with respect to time.

Synchronizing the data from the log and the plurality of transfer parameters with respect to time may occur before wirelessly transmitting data from the log and the plurality of transfer parameters to remote data storage. Wirelessly transmitting data from the log and the plurality of transfer parameters to remote data storage may include wirelessly transmitting the synchronized data to the remote data storage.

Wirelessly transmitting data from the log and the plurality of transfer parameters to remote data storage may occur before synchronizing the data from the log and the plurality of transfer parameters with respect to time.

The mobile tagger may be a handheld wireless device.

The plurality of transfer parameters may include time, which may include date. The plurality of transfer parameters may include the current location of the wellsite. The plurality of transfer parameters may include an identifier associated with the wellsite and differentiating the wellsite from other wellsites. The mobile tagger may be operable to scan a code associated with the wellsite to identify the wellsite. The code may be selected from the group consisting of: an alphanumeric code, a barcode, and a radio frequency identification code.

The plurality of transfer parameters may include an identification of the one of the plurality of wellsite assets selected to receive the resupply. The mobile tagger may be operable to scan a code associated with identification. The code may be selected from the group consisting of: an alphanumeric code, a barcode, and a radio frequency identification code.

The plurality of transfer parameters may include an identification of a human operator that is performing the transfer of bulk material from the supply to the selected one of the plurality of wellsite assets.

Wirelessly transmitting may include wirelessly transmitting via at least one network selected from the group consisting of: a satellite telecommunications network; a cellular telecommunications network; and a wireless local area network (WLAN).

The method may further comprise permitting access to the wirelessly transmitted, synchronized data by multiple users in different geographic locations, perhaps via at least one network selected from the group consisting of: a satellite telecommunications network; a cellular telecommunications network; a wireless local area network (WLAN); and the internet. The multiple users may have different access levels.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

The invention claimed is:

1. A wellsite system, comprising:
   a bulk material transporter comprising:
      a supply of a bulk material, wherein the bulk material comprises combustion engine fuel;
      a meter operable to measure output of the bulk material from the supply; and
      a data logger operable to log the output as a function of a predetermined parameter;
   a mobile tagger operable to assign a plurality of transfer parameters to each of a plurality of transfers of the bulk material from the supply to corresponding ones of a plurality of assets located at the wellsite, wherein the plurality of transfer parameters includes the output measured by the meter; and
   an uplink operable to wirelessly transmit data from the log and the plurality of transfer parameters to remote data storage not located at the wellsite, the uplink further operable to synchronize the data from the bulk material transporter and the mobile tagger with respect to time prior to transmitting the synchronized data to the remote data storage.

2. The wellsite system of claim 1 wherein the bulk material transporter is a motor vehicle operable to position the supply proximate one of the plurality of assets selected to receive a resupply of the bulk material from the supply.

3. The wellsite system of claim 1 wherein the plurality of assets includes:
   a pump powered by the bulk material; and
   a generator powered by the bulk material.

4. The wellsite system of claim 1 wherein the uplink is operable to wirelessly transmit data via at least one network selected from the group consisting of:
   a satellite telecommunications network;
   a cellular telecommunications network; and
   a wireless local area network (WLAN).

5. The wellsite system of claim 1 wherein the bulk material transporter comprises a computer operable to:
   control the data logger;
   synchronize the log with data received from the mobile tagger; and
   wirelessly transmit the synchronized data to the uplink.

6. The wellsite system of claim 1 further comprising the remote data storage, wherein the data received by the remote data storage from the uplink is accessible by multiple users, and wherein the multiple users are in different geographic locations and have different access levels to the data.

7. A bulk material transporter, comprising:
   a supply of a bulk material;
   a motor vehicle operable to position the supply of bulk material proximate one of a plurality of assets selected to receive a resupply of the bulk material, wherein the plurality of assets includes a motor vehicle powered by the bulk material and operable to transport another one of the plurality of assets that is also powered by the bulk material;

a meter carried by the motor vehicle and operable to measure output of the bulk material from the supply;

a data logger carried by the motor vehicle and operable to log the output of the bulk material as a function of a predetermined parameter; and a mobile tagger removable from the motor vehicle and operable to assign a plurality of transfer parameters to each of a plurality of transfers of the bulk material from the supply to the corresponding ones of the plurality of assets, wherein the plurality of transfer parameters includes the output measured by the meter.

8. The bulk material transporter of claim 7 wherein the mobile tagger is a handheld wireless device.

9. The bulk material transporter of claim 7 wherein:

the function of the predetermined parameter is a function of time; and the plurality of transfer parameters includes time.

10. The bulk material transporter of claim 7 wherein the plurality of transfer parameters includes:

a first identification identifying current location of at least the supply of the bulk material; and a second identification identifying which of the plurality of assets is receiving a resupply of the bulk material.

11. The bulk material transporter of claim 10 wherein the mobile tagger is operable to scan a code indicative of at least one of the first and second identifications.

12. A method, comprising:

selecting one of a plurality of wellsite assets at a wellsite to receive a resupply of a bulk material;

operating a motor vehicle to position a supply of the bulk material proximate the selected one of the plurality of wellsite assets, wherein the motor vehicle is powered by the bulk material;

resupplying the bulk material by transferring a measured amount of the bulk material output from the supply to the selected one of the plurality of wellsite assets;

generating a log of the output of the bulk material as a function of a predetermined parameter;

operating a mobile tagger to assign a plurality of transfer parameters to the transfer, wherein the plurality of transfer parameters includes the measured amount of the bulk material output from the supply to the selected one of the plurality of wellsite assets;

wirelessly transmitting data from the log and the plurality of transfer parameters to remote data storage not located at the wellsite;

synchronizing the data from the log and the plurality of transfer parameters with respect to time; and permitting access to the wirelessly transmitted, synchronized data by multiple users in different locations via at least one network, wherein the multiple users have different data access levels.

13. The method of claim 12 wherein:

synchronizing the data from the log and the plurality of transfer parameters with respect to time occurs before wirelessly transmitting data from the log and the plurality of transfer parameters to remote data storage; and wirelessly transmitting data from the log and the plurality of transfer parameters to remote data storage includes wirelessly transmitting the synchronized data to the remote data storage.

14. The method of claim 12 wherein wirelessly transmitting data from the log and the plurality of transfer parameters to remote data storage occurs before synchronizing the data from the log and the plurality of transfer parameters with respect to time.

15. The method of claim 12 wherein permitting access to multiple users in different locations comprises permitting access via at least one network selected from the group consisting of:

a satellite telecommunications network;

a cellular telecommunications network;

a wireless local area network (WLAN); and the internet.

16. The method of claim 15 wherein the different data access levels comprise at least an unlimited data access level and a limited access level providing access to a portion of the data.

* * * * *